United States Patent [19]

Petersen et al.

[11] 3,978,779
[45] Sept. 7, 1976

[54] APPARATUS FOR PREPARING EDIBLE PRODUCTS

[75] Inventors: Gunnar Christian Petersen, Odense; Ole Thisgaard, Hjallese; Steen Wiig, Naesby, all of Denmark

[73] Assignee: Dansk Andels Aegexport, Copenhagen, Denmark

[22] Filed: Nov. 24, 1975

[21] Appl. No.: 634,708

[30] Foreign Application Priority Data
Nov. 29, 1974 Denmark .......................... 6241/74

[52] U.S. Cl. .................................. 99/353; 99/427; 426/490
[51] Int. Cl.² ............................................ A47J 43/20
[58] Field of Search ...... 99/353, 349, 354, 380–381, 99/382–383, 384, 426–427, 428, 440–441, 442; 249/92; 426/490

[56] References Cited
UNITED STATES PATENTS

| | | | |
|---|---|---|---|
| 1,984,027 | 12/1934 | Lyons | 99/442 X |
| 2,243,492 | 5/1941 | Wilson | 99/353 UX |
| 2,352,447 | 6/1944 | Powers et al. | 99/386 X |
| 2,897,745 | 8/1959 | Nichols et al. | 99/427 X |
| 3,285,749 | 11/1966 | Shires | 426/490 |
| 3,374,728 | 3/1968 | Owens | 99/353 |
| 3,505,948 | 4/1970 | Carre et al. | 99/353 |
| 3,712,208 | 1/1973 | Adolphi | 99/427 X |
| 3,823,659 | 7/1974 | Hubka et al. | 99/427 X |

*Primary Examiner*—Stanley N. Gilreath
*Assistant Examiner*—Arthur O. Henderson
*Attorney, Agent, or Firm*—Sughrue, Rothwell, Mion, Zinn and Macpeak

[57] ABSTRACT

An apparatus for preparing edible products having a cylindrical shell of coagulated egg-white enclosing a central core. The apparatus has a plurality of cylindrical moulds moving cyclically in a closed path including stations in which raw materials are supplied and stations in which the finished products are withdrawn from the mould. Each mould is provided with a vertically displaceable bottom plug, which is pushed upwards to permit withdrawal of the finished product. It is subsequently pushed to the bottom of the mould by means of a rod carrying a pad for applying a metered amount of a lubricating agent onto the mould surface before a core member is inserted in the mould and the raw materials are supplied. Means are provided for cleaning the mould wall during the upward movement of the bottom plug.

14 Claims, 5 Drawing Figures

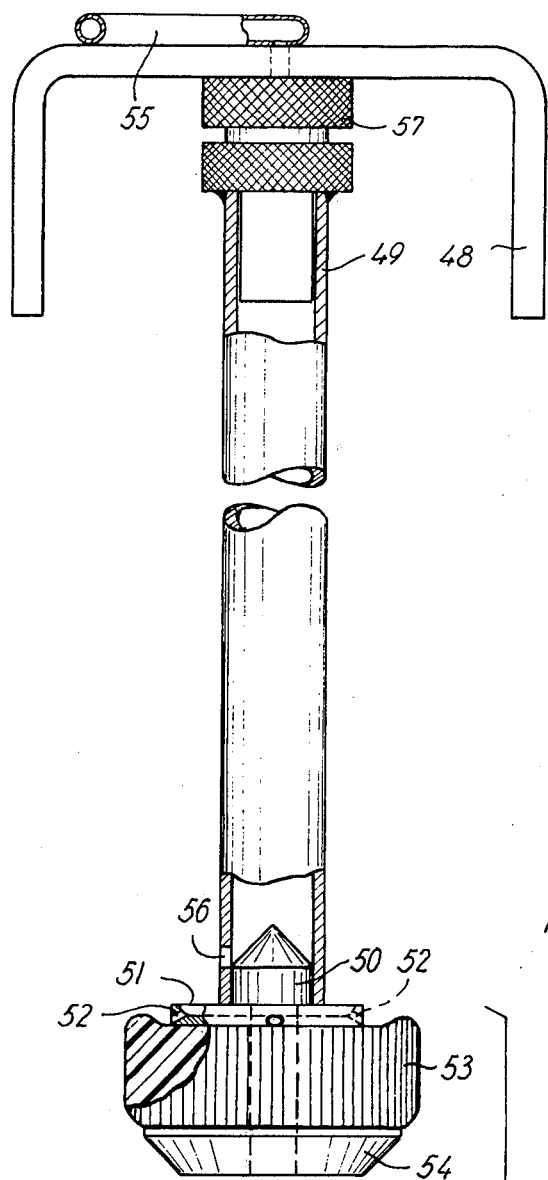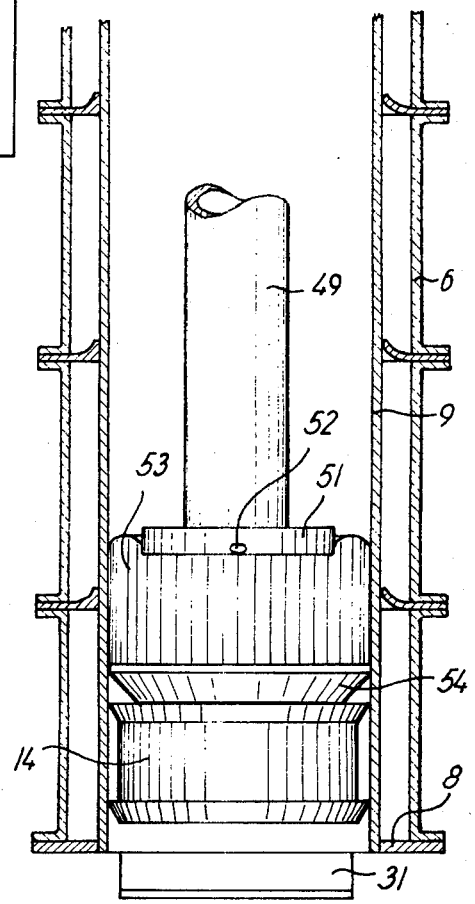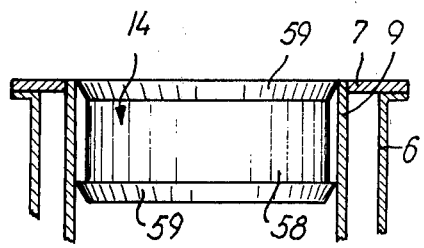
FIG. 5
FIG. 4

APPARATUS FOR PREPARING EDIBLE PRODUCTS

BACKGROUND OF THE INVENTION

The present invention relates to apparatus for preparing an edible product including a cylindrical core and an outer, cylindrical shell of coagulated egg-white mass. The apparatus comprises a plurality of vertically oriented cylindrical moulds which are open at their top and closed at their bottom, means for cyclically moving the moulds through a plurality of successive stations including a station for inserting a core member into each mould, a station for later withdrawing the core member, one or more stations for supplying liquid egg-white mass to the annular space defined between the inner wall of the mould and the core member, and for supplying a product core forming material to the space formed by the core member, a station for withdrawing finished products from the moulds, and means for heating and subsequently cooling the moulds during their travel through the stations.

The core of the finished products will normally consist of coagulated egg yolk, but may also consists of other edible materials such as minced meat, vegetables etc. or contain one or more such materials as additives to the yolk mass. Colouring agents, flavouring additives or preservatives may also be included in the egg-white and/or the product core. The cross-section of the product may be arbitrary, but its contour will in most cases be circular or smoothly curved, such as oval.

An apparatus of the kind referred to is disclosed in US Pat. specification No. 3,823,659. In the known apparatus each mould is formed as a relatively thin, longitudinally slit shell made of a curved metal sheet which, due to its resiliency, is held in tight engagement with a tubular member extending through a heating vessel in the apparatus. Each mould is withdrawn from the apparatus together with the finished product, and the mould may then expand radially whereby the product is released in such a way that the risk of adhesion between the mould surface and the coagulated shell of egg-white is rather small. Since the period necessary for coagulating the product can hardly be reduced much below about 20 minutes even when the liquid egg-white mass is preheated, an acceptable production rate of the apparatus can only be obtained by the provision of a considerable number of moulds, and the apparatus must include means for withdrawing the moulds and re-inserting them in two different stations, means for transferring empty moulds from one station to the other and means for cleaning the moulds outside of the apparatus before they are re-inserted. All this makes the apparatus rather complicated and expensive. It may also be difficult, in particular after prolonged use of the resilient moulds, to ensure a tight fit between the entire outer surface of the mould shells and the inner surface of the tubular members, which receive the moulds, and this may result in a reduced efficiency of the heat transmission to the product components within the moulds and hence in a reduced production rate.

SUMMARY OF THE INVENTION

The present invention provides apparatus for preparing an edible product including a cylindrical product core and an outer, cylindrical shell of coagulated egg-white mass, the apparatus comprising:

a plurality of vertically oriented cylindrical moulds, each formed by an integral cylindrical tube open in both ends, a bottom plug axially displaceable within each mould in sealing engagement with the inner mould surface, means for cyclically moving said moulds through a plurality of successive stations including a station for inserting a core member in each mould, a station for withdrawing the core member from the mould, at least one station for supplying liquid egg-white mass to the annular space defined between the inner wall of the mould and the core member, and supplying a material to form said product core to the space formed by the core member, and a station for withdrawing finished products from said moulds, means for heating said moulds and means for subsequently cooling the moulds, lifting means adapted to move each bottom plug upwardly through at least the majority of the height of the associated mould for permitting withdrawal of the finished product from the top of the mould, means adapted to move each bottom plug back to its lowermost position in the associated mould, and applicator means for applying a measured amount of a lubricating agent onto the inner surface of each mould after the associated bottom plug has been lifted and the product withdrawn from the mould.

Compared with the known apparatus discussed above, an apparatus according to the invention may be considerably simplified and hence cheaper because the moulds now form an integral part of the apparatus. The heat transmission to the egg-white mass in the moulds is also improved, which results in a better heat energy economy, because the temperature, to which the moulds are cooled, may be substantially higher than in the known apparatus in which the moulds are withdrawn after each working cycle. Since the cooling is primarily effected in order to ensure the termination of the coagulation process at a well-defined time during the cycle, it will normally involve a lowering of the temperature of the mould wall only to about 35° to 40°C which is well beyond room temperature. The open-ended tubular moulds make it easy to clean the mould walls at suitable intervals during a period in which the apparatus is stopped, e.g. once a day or after each work shift, and in operation of the apparatus the reciprocation of the bottom plugs through the moulds once during each cycle will normally be able to ensure that small lumps of coagulated egg-white, which may get torn from the product during its withdrawal, will be prevented from adhering permanently to the mould wall and in this way impair the surface quality of the subsequently formed products.

The maintaining of a clean mould surface may be further enhanced by providing, on each bottom plug, an upwardly directed scraper edge in tight engagement with the inner mould surface.

The bottom plug may be fabricated from a plastics material or synthetic rubber which permits to design it with a suitable resiliency ensuring its sealing engagement with the mould wall even at varying temperatures of the bottom plug and the mould wall.

The applicator means may comprise a vertically displaceable carrier rod associated with each of a plurality of moulds, an applicator member carried by the lower end of each rod, means for lowering the carrier rod into the mould and lifting it out of the mould after the finished product has been withdrawn from the mould, and means for effecting a volumetric proportioning of the lubricating agent to the applicator member during the motion cycle of the carrier rod. This ensures the formation of a uniform film of parting or lubricating agent on the entire mould surface so that the adhesion between this surface and the coagulated egg-white is reduced to a minimum, and at the same time avoids the risk of local overdosage which might result in penetration of the lubricating agent into the egg-white.

For permitting an exact dosage of lubricating agent to each mould, the proportioning means may include a separate pump associated with each applicator member.

The lower end of the carrier rod may be adapted to push the bottom plug downwardly within the mould. This simplifies the design of the bottom plug and of the means for moving the plug through the mould because no special means are required for gripping the plug and pulling it downwards to its lowermost position.

The applicator member may be a pad made of a spongy material and having a cross-section larger than the internal cross-section of the mould, whereby the pad is radially compressed when it is moved through the mould. Such a pad can be kept constantly wetted by the lubricating agent on its surface with the calculated amount of lubricating agent being supplied to it at an arbitrary, and consequently less critical, moment of each working cycle and it has proved capable of ensuring a highly uniform distribution of the lubricating agent. In addition, the pad can to some extent intercept and retain lumps of coagulated egg-white broken loose from the product surface, as well as other foreign matter, so that it may contribute to keep the mould wall clean.

BRIEF DESCRIPTION OF THE DRAWINGS

A preferred embodiment of the invention will now be described in detail with reference to the accompanying schematical drawings in which

FIG. 4 is a vertical section on a still larger scale showing the applicator means before the application of a lubricating agent commences, and FIG. 5 is a corresponding section showing the applicator means and the bottom plug at the termination of the application step.

DETAILED DESCRIPTION

Figure 1:
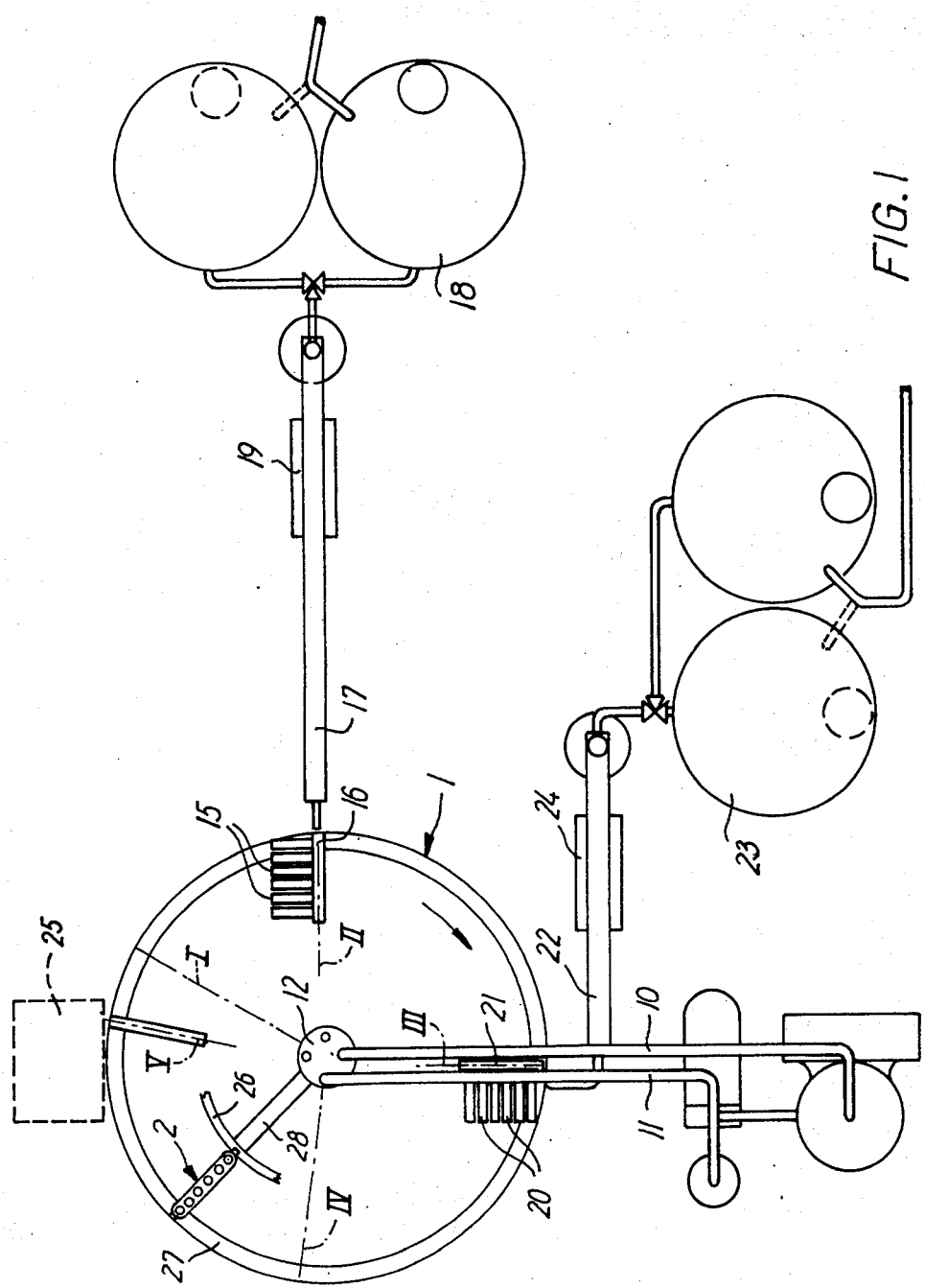
FIG. 1 is a plan view of the apparatus together with some ancillary equipment, for illustrating the manufacturing process carried out in the apparatus.

The apparatus illustrated in the drawings comprises a turret, generally designed by 1, which carries a plurality of radially extending mould sectors 2. In the embodiment shown there is a total of 32 sectors each having six mould chambers. The frame 3 of the apparatus, which is shown quite diagramatically in FIG. 2, includes a vertically oriented central column 4 about which the turret 1 is rotatable, and which is supported by feet 5.

The turret is rotated intermittently about the column 4 in steps each corresponding to the angular spacing between two successive mould sectors 2, by means of a drive mechanism (not shown) which may comprise a toothed ring secured to the periphery of the turret or an endless roller chain welded thereto, and a drive pinion or sprocket which is rotated from a drive motor through a ratchet device.

Figure 3:
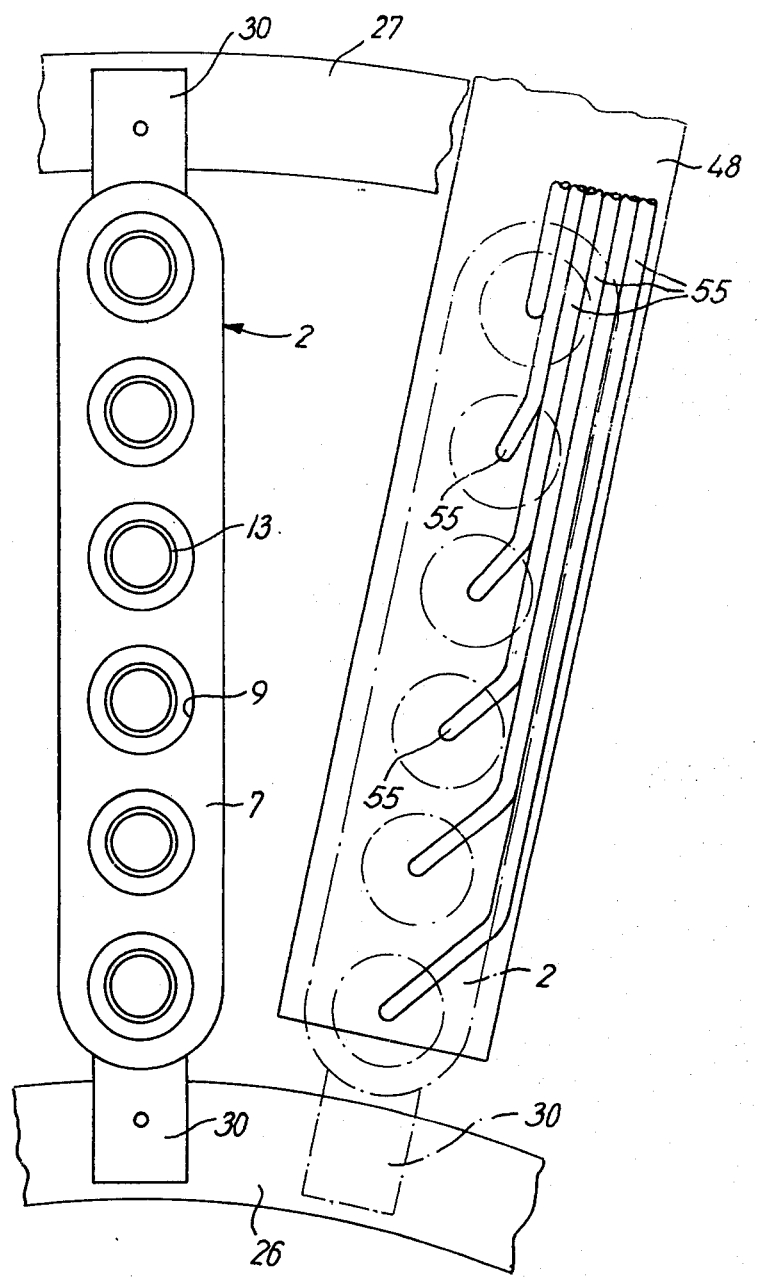
FIG. 3 is a plan view on a still larger scale showing a mould sector seen from above in two different positions, viz. during the coagulation of the egg-white mass in the mould cylinders and associated with the device for lubricating the cylinder walls and depressing the bottom plugs of the moulds.

Each mould sector, see also FIGS. 3 to 5, comprises a vertical shell 6 which is closed at its top and bottom by means of upper and lower cover plates 7 and 8. Each cover plate is formed with six apertures in which six mould cylinders 9 are sealingly secured. As intimated in FIG. 5 the annular space between shell 6 and moulds 9 may be divided in superposed chambers which are mutually connected by pipes or other suitable means (not shown) creating an expedient flow path through the mould sector for a heating medium and a cooling medium.

Figure 2:
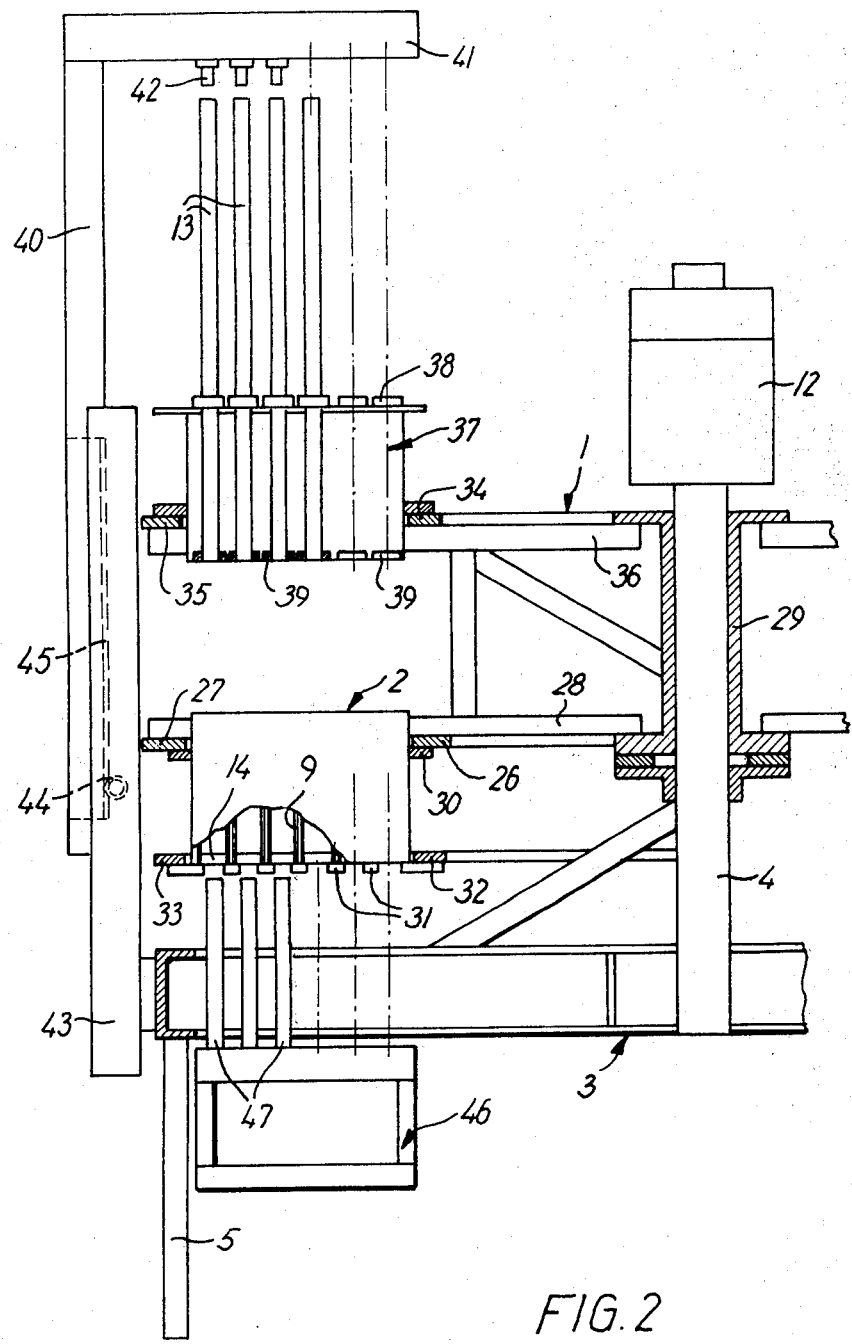
FIG. 2 is a vertical radial section, on a larger scale, through a little more than one half of the apparatus, the lower part of the figure illustrating the station in which the finished product is withdrawn, while the upper part illustrates the station in which tubular core members are inserted in the mould cylinders of the apparatus.

As intimated in FIGS. 1 and 2 heating and cooling medium, which may be water at about 90° and about 35°C, respectively, is supplied through stationary ducts 10 and 11 to a distributor 12 arranged at the upper end of column 4. The part of the distributor 12, which rotates together with the turret 1, is connected with the individual mould sectors by means of ducts (not shown) preferably comprising flexible hoses. In the distributor or in the individual connecting ducts there may be provided valves which control the supply of heating and cooling medium to the mould sectors and which switch from heating to cooling at suitable times during the working cycle. This is schematically indicated in FIG. 1 by means of a station IV in which the supply of heating medium ceases and the supply of cooling medium comences, and a station V in which the valves switch from cooling to heating, in the embodiment shown simultaneously with the withdrawal of the finished products. It will be appreciated that the apparatus may be provided with means for varying or adjusting the location of station IV so that the duration of the heating period, in which the product forming raw materials are coagulated in the mould cylinders 9, may be changed.

In a station I located shortly after station V the depression of the bottom plugs through the mould cylinders, which is described in more detail below, occurs together with a lubricating of the cylinder walls. If the bottom plugs have been pushed up to a position flush with the upper surface of the cover plates 7 in connection with the previous withdrawal of the products, the upper surface of the bottom plugs may be cleaned during the passage from station V to station I, e.g. by means of a stationary scraper means which is kept in contact with the surface of the bottom plugs.

In a subsequent station II a core tube 13 is first inserted in each mould cylinder 9 in sealing contact with the bottom plug 14 of the mould, and thereafter a metered amount of egg-white is supplied to the annular space between core 12 and the inner wall of mould 9. For supplying the egg-white there may be provided a unit comprising a piston pump 15 associated with each mould and a valve block 16 having discharge ducts, preferably short flexible hoses ending shortly above the mould cavities, and a supply duct 17 through which egg-white mass is conveyed from a storage tank 18 through a preheater 19.

During the intermittent rotation of each mould sector 2 from station II to station III, a preliminary coagulation of the egg-white mass between cores 13 and moulds 9 occurs, and in station III the coagulation has proceeded so far that the shell of egg-white mass, while still being relatively soft, has attained a suitable internal coherence. In station III the tubular cores 13 are withdrawn upwardly from the moulds and after the withdrawal a metered amount of preheated egg-yolk mass is supplied to each of the central cavities left by the withdrawn core. For supplying the yolk mass there is provided a unit similar to that used for supplying the egg-white mass, and which comprises a plurality of piston pumps 20, a valve block 21 with discharge ducts (not shown) leading to the individual moulds and a supply duct 22 connected to a storage tank 23 through a preheater 24. In view of the relatively soft consistency of the partially coagulated egg-white it is desirable that the supply of yolk mass is effected as far as possible centrally to said cavity, and the apparatus may comprise means (not shown) for mechanically displacing the discharge aperture of the discharge ducts issuing from valve block 21 between said central position which they assume during the metering operation, and a second position in which they are clear of the tubular cores 13.

During the continued rotation of the mould sector 2 to the previously mentioned station IV, the final coagulation of both egg-white and yolk occurs, and as previously mentioned the coagulation process is interrupted by the supply of cooling medium through the jacket of the mould sector in the interval between stations IV and V. In the latter station the six bottom plugs 14 of each mould sector are simultaneously pushed upwardly whereby they raise the finished products above the top cover plate 7 of the mould sector. The products are gripped by means of a device (not shown) which swings them beyond the periphery of the turret and deliver them, e.g. to the schematically shown inlet end 25 of a packaging machine (not shown). In the packaging machine, which may be of any suitable and known design, each product may be packaged in a suitable way, e.g. wrapped in a surrounding sheet material in which the products may be distributed.

As intimated in FIG. 2 the turret 1 may comprise two concentric rings 26 and 27 located in a common plane, and radial spokes 28 connecting the rings with each other and with a centrally located bearing sleeve 29 by means of which the turret is supported on column 4. The mould sectors 2 have radially projecting tabs 30 for bolting them to rings 26 and 27. To the underside of the lower cover plates 8 there are secured abutment strips 31, which slightly overlap the lower openings of each mould 9 so that they function as stop means for defining the lowermost position of the bottom plugs 14. Two rings 32 and 33, to which the mould sectors 2 are bolted at the lower end, are rigidly connected with rings 26 and 27 by suitable means (not shown).

The turret further comprises two concentric rings 34 and 35 which are located in a common plane and connected to sleeve 29 by means of radial spokes 36. As indicated in FIG. 2 rings 34 and 35 may also be rigidly connected with subjacent rings 26 and 27. Above each mould sector 2 a frame 37 for holding the cores 13 associated with the mould sector is bolted to rings 34 and 35. Each holding frame has upper and lower bearings 38 and 39, respectively, for laterally supporting associated cores 13, and in the stations II and III there are provided stationary devices along the periphery of the turret for inserting and withdrawing, respectively, a core 13 in each associated mould 9. The device for inserting the cores, which is schematically shown in FIG. 2, comprises a vertically displaceable column 40, which at its upper end carries a boom 41 extending radially inwardly and having gripper means 42 for aligning and depressing each core 13 when the column is lowered. The column is suitable guided, e.g. by means of rollers and cooperating guide rails (not shown) in a stationary guide 43 which is secured to frame 3. The column is raised and lowered by means of a pinion 44 journalled in guide 43 and driven by a motor (not shown), which pinion meshes with a rack 45 secured to column 40. A similar device, in which the means for gripping the cores may be slightly modified, is arranged in station III in which the cores are withdrawn before the yolk mass is supplied.

The raising of the bottom plugs 14 and of the finished products in station V is effected by means of device schematically shown in FIG. 2 and comprising a frame 46 which on its upper side carries six push rods 47. When frame 46 is lifted, the rods 47 engage the underside of the bottom plugs 14 and push the plugs and the coagulated products upwardly through the cylinders. The reciprocation of frame 46 may be effected by means of a mechanism (not shown) comprising a rack secured to each of the vertical frame members and two pinions meshing with the racks and secured to a common motor driven shaft, which ensures an exactly rectilinear and uniform raising of all push rods 47. It will be appreciated that frame 46 must also be suitably guided for reciprocation, e.g. similar to the guiding of column 40 in guide 43 described above.

After the withdrawal of the finished products in station V, if desired followed by a cleaning of the upper faces of bottom plugs 14, the plugs are pushed downwardly to their lowermost position engaging the abutment strips 31. This occurs in station I in which there is provided an arm 48, see FIGS. 3 and 4, which extends radially inwardly and supports a downwardly extending tubular rod 49 centrally aligned above each mould cylinder 9. A pin 50 has a press fit in the lower end of rod 49 and immediately below rod 49 the pin carries a cup shaped distributor disc 51 having a plurality of evenly spaced bores 52 through wich a parting or lubricating agent may flow out for wetting a pad 53 of a suitable foam material such as foam latex or foam plastics. Pad 53 is squeezed between disc 51 and a washer 54, which is secured to pin 50 and which also serves for centering rod 49 and pad 53 in mould 9. Washer 54 may be shaped as a spider so that it permits a flow of lubricating agent down to the upper face of bottom plug 14.

The lubricating agent, which e.g. may be corn oil, groundnut oil or a synthetic agent such as a silicone, is supplied from a plurality of positive displacement metering pumps (not shown), of which one is provided for each mould 9, through pipes 55 arranged above arm 48 to the interior of the hollow rods 49. From the lower end of each rod the lubricating agent flows through one or more bores 56 in the wall of the rod to distributor disc 51 and through the bores 52 therein to pad 53. As also shown in FIG. 4, it may be expedient to connect each rod 49 detachably with arm 48 by means of a quick-release coupling 57 so that the rods 49 may readily be dismounted, in particular for cleaning the pads 53.

During each working cycle the metering pumps mentioned above are actuated for delivering a metered quantity of the lubricating agent to each pad 53, and each time a mould sector 2 is stationary in station I, arm 48 and the six rods 49 suspended therefrom are moved downwardly. Consequently, the washers 54 secured to the lower ends of rods 49 push the bottom plugs 14 downwardly in the moulds 9, see FIG. 5, while simultaneously the pads 53 moving in engagement with the mould wall apply a uniform layer of lubricating agent to the wall. As shown in FIG. 4 the pads are slightly larger than the internal cross-section of the moulds so that they are radially compressed when they move through the moulds.

As shown in FIGS. 4 and 5, the bottom plug 14 may be formed with a central portion 58 having a clearance relative to mould 9, and two end portions 59 which both taper downwardly and whose upper and relatively sharp-edged periphery ensure the sealing engagement against the mould wall when the plugs are made of a material having a suitable resiliency. The edges of portions 59 also effect a certain scraping action upon the mould surface when they move upwardly during the withdrawal of the finished product so that the mould surface is kept free of deposits which might be detrimental for the subsequent coagulation process.

It may be mentioned that the described device for pressing down the bottom plugs 14 and lubricating the mould walls is located in the free vertical space between the upper side of the mould sectors 2 and the lower side of the associated frames 37 which support the tubular cores. Consequently, the cores may remain in their fixed orientation axially aligned with the associated mould cylinders during the rotation of the turret. Also the briefly mentioned device for withdrawing the finished products will be designed with a height such that the components thereof, which have to move within the outer periphery of the turret, may be accommodated in said vertical space.

If it is desired that both ends of the finished products shall be very smooth and uniform, there may be provided a further station immediately before the station in which the bottom plugs are raised for permitting withdrawal of the product from the moulds. In the additional station there may be effected a slight preliminary raising of the bottom plugs so that the uppermost end of the products protrude above the top cover plate of the mould sector. During the subsequent movement of the mould sector to the withdrawal station, the uppermost end of each product may then be trimmed off by means of stationary cutting means.

In another modification of the apparatus shown the bottom plugs of the mould cylinders may cooperate with vertically displaceable grippers provided in a station immediately after the product withdrawal station. The lubricating agent may then be supplied at the start of the downward movement of the bottom plug which consequently — when it is properly shaped — may serve for distributing the lubricating agent onto the mould surface. In this embodiment there might be provided one or more apertures shortly above the bottom of each mould wall, which apertures would be uncovered at the termination of the downward movement of the bottom plug so that excess lubricating agent, if any, would escape through the apertures. Before the metering of the raw materials, the bottom plug would be slightly lifted to a position which it will assume during the supply of the raw materials and the subsequent coagulation thereof, and in which position it closes the apertures.

For supplementing the scraping action excerted on the mould walls by the bottom plugs there may be provided scrapers on the upper side of the applicator means, such as upwardly extending leaf springs, which are pressed outwardly into engagement with the wall due to their resiliency. Such scrapers would be effective during the upward movement of the applicator means whereas they would not impede the downward movement of the applicators. The above mentioned push rods, which raise the bottom plugs for permitting the withdrawal of the finished products, may also be designed as support shafts for rotary brushes which effect a further cleaning of the mould walls when the bottom plugs are raised.

In the embodiment described in detail above the egg-white is supplied first to the mould and partly coagulated, following which the core member is withdrawn and the yolk is supplied to the cavity left by the core member. In some cases it may however alternatively be possible to supply the egg-white and the product core forming material simultaneously at the outer and inner side, respectively, of a tubular core member and to withdraw the core member after a preliminary coagulation of at least the egg-white, similar to what is described in U.S. patent specification No. 3,823,659 referred to above.

Even if the invention has been described above as an apparatus for preparing an egg product, it will be understood that it may have utility also in connection with the manufacture of other products which include a core and an outer shell consisting of materials which can be supplied to the respective mould cavities in fluent or flowable state and subsequently solidify in the mould by any suitable means promoting chemical and- /or physical changes in the materials.

What we claim is:

1. Apparatus for preparing an edible product including a cylindrical product core and an outer cylindrical shell of coagulated egg-white mass, said apparatus comprising:
    a plurality of vertically oriented cylindrical moulds, each formed by an integral cylindrical tube open at both ends,
    a bottom plug axially displaceable within each mould in sealing engagement with the inner mould surface,
    means for cyclically moving said moulds through a plurality of successive stations including a station for inserting a core member in each mould, a station for withdrawing the core member from the mould, at least one station for supplying liquid egg-white mass to the annular space defined between the inner wall of the mould and the core member, and supplying a material to form said product core to the space formed by the core member, and a station for withdrawing finished products from said mould,
    means for heating said moulds and means for subsequently cooling the moulds,
    lifting means adapted to move each bottom plug upwardly through at least the majority of the height of the associated mould for permitting withdrawal of the finished product from the top of the mould, means adapted to move each bottom plug back to its lowermost position in the associated mould, and applicator means for applying a measured amount of a lubricating agent onto the inner surface of each mould after the associated bottom plug has been lifted and the product withdrawn from the mould.

2. Apparatus as claimed in claim 1, wherein each bottom plug is provided with an upwardly directed scraper edge in tight engagement with the inner mould surface.

3. Apparatus as claimed in claim 1, wherein the bottom plugs are made of a material selected from the group consisting of plastics materials and synthetic rubber.

4. Apparatus as claimed in claim 1, wherein said applicator means comprises a vertically displaceable carrier rod associated with each of a plurality of moulds, an applicator member carried by the lower end of each said rod, means for lowering said carrier rod into said mould and lifting it out of the mould after the finished product has been withdrawn from the mould, and means for effecting a volumetric proportioning of said lubricating agent to said applicator member during the motion cycle of said carrier rod.

5. Apparatus as claimed in claim 4, wherein said proportioning means includes a separate pump associated with each applicator member.

6. Apparatus as claimed in claim 4, wherein the lower end of said carrier rod is adapted to push the bottom plug downwardly within the mould.

7. Apparatus as claimed in claim 6, further comprising abutment means protruding inwardly below each mould for defining the lowermost position of the bottom plug.

8. Apparatus as claimed in claim 4, wherein said applicator member is a pad made of a spongy material and having a cross-section larger than the internal cross-section of the mould, whereby the pad is radially compressed when it is moved through the mould.

9. Apparatus as claimed in claim 8, further comprising a distributor cup mounted above said pad for distributing the lubricating agent.

10. Apparatus as claimed in claim 9, wherein said distributor cup is formed with a plurality of distributor ducts evenly spaced along the circumference thereof.

11. Apparatus as claimed in claim 8, further comprising a guide member secured to said carrier rod below said pad for radially guiding the rod in the mould.

12. Apparatus as claimed in claim 11, wherein the guide member is shaped as a spider.

13. Apparatus as claimed in claim 4, further comprising scraper means secured at the upper face of each applicator member and spring biased outwardly into engagement with the mould surface.

14. Apparatus as claimed in claim 1, further comprising rotary brushes supported by said bottom plug lifting means and engaging the inner mould surfaces below the bottom plugs during the lifting thereof.

* * * * *